United States Patent
Hawkins

(10) Patent No.: US 7,383,061 B1
(45) Date of Patent: Jun. 3, 2008

(54) PERIPHERAL DEVICE FOR A WIRELESS COMMUNICATION DEVICE

(75) Inventor: Jeffrey C. Hawkins, Atherton, CA (US)

(73) Assignee: Palm, Inc., Sunnyvale, CA (US)

( * ) Notice: Subject to any disclaimer, the term of this patent is extended or adjusted under 35 U.S.C. 154(b) by 140 days.

(21) Appl. No.: 10/815,406

(22) Filed: Apr. 1, 2004

Related U.S. Application Data

(60) Provisional application No. 60/460,013, filed on Apr. 2, 2003.

(51) Int. Cl.
*H04M 1/00* (2006.01)

(52) U.S. Cl. .............. 455/556.2; 455/556.1; 455/557; 455/566; 455/575.3; 455/90.3; 345/169; 345/172

(58) Field of Classification Search ............ 455/426.1, 455/550.1, 566, 418–420, 556.1–557, 575.1–575.9, 455/90.3, 41.1–41.3, 456.1–2; 709/227–228; 345/169, 172

See application file for complete search history.

(56) References Cited

U.S. PATENT DOCUMENTS

| | | | | |
|---|---|---|---|---|
| 5,020,090 | A * | 5/1991 | Morris | 455/556.1 |
| 5,297,142 | A * | 3/1994 | Paggeot et al. | 370/461 |
| 5,625,673 | A * | 4/1997 | Grewe et al. | 455/556.2 |
| 5,664,228 | A * | 9/1997 | Mital | 710/62 |
| 5,724,655 | A * | 3/1998 | Grube et al. | 455/419 |
| 5,727,159 | A * | 3/1998 | Kikinis | 709/246 |
| 5,797,089 | A * | 8/1998 | Nguyen | 455/403 |
| 5,870,680 | A * | 2/1999 | Guerlin et al. | 455/557 |
| 5,873,045 | A * | 2/1999 | Lee et al. | 455/556.2 |
| 5,983,073 | A * | 11/1999 | Ditzik | 455/11.1 |
| 6,034,621 | A * | 3/2000 | Kaufman | 340/7.21 |
| 6,157,982 | A * | 12/2000 | Deo et al. | 711/100 |
| 6,311,209 | B1 | 10/2001 | Olson et al. | |
| 6,401,113 | B2 * | 6/2002 | Lazaridis et al. | 709/207 |
| 6,546,262 | B1 * | 4/2003 | Freadman | 455/557 |
| 6,577,877 | B1 * | 6/2003 | Charlier et al. | 455/557 |
| 6,625,472 | B1 * | 9/2003 | Farazmandnia et al. | 455/557 |
| 6,633,759 | B1 * | 10/2003 | Kobayashi | 455/419 |

(Continued)

FOREIGN PATENT DOCUMENTS

EP 1215575 A2 6/2002

(Continued)

OTHER PUBLICATIONS

Dasgupta, S. et al., "Movable User Interface Based on a Simple X-Window Like Protocol," Gas Authority of India Ltd., Aug. 1991, pp. 199-203, vol. 3.

(Continued)

*Primary Examiner*—Sharad Rampuria
(74) *Attorney, Agent, or Firm*—Fenwick & West LLP

(57) ABSTRACT

A peripheral device for a wireless communication device combines a full-sized input device and a full-sized display screen in a single device. A user interacts with data stored on the wireless communication device using the peripheral device as an input/output device. The peripheral device accesses data residing on the wireless communication device and uses the data to run applications. The results of the execution are stored on the wireless communication device. The peripheral device is capable of operating with any wireless communication device, such as a cell phone, or other device such as a handheld computer, a PDA, a pager, and the like.

20 Claims, 5 Drawing Sheets

U.S. PATENT DOCUMENTS

| | | | |
|---|---|---|---|
| 6,895,220 B2 * | 5/2005 | Usui | 455/41.2 |
| 6,947,975 B2 | 9/2005 | Wong et al. | |
| 6,957,085 B2 * | 10/2005 | Shin et al. | 455/557 |
| 6,999,792 B2 * | 2/2006 | Warren | 455/557 |
| 7,013,112 B2 * | 3/2006 | Haller et al. | 455/41.2 |
| 7,047,038 B1 * | 5/2006 | Macor | 455/556.1 |
| 7,054,594 B2 * | 5/2006 | Bloch et al. | 455/41.2 |
| 2002/0151283 A1 | 10/2002 | Pallakoff | |
| 2004/0006551 A1 | 1/2004 | Sahinoja et al. | |

FOREIGN PATENT DOCUMENTS

| | | |
|---|---|---|
| EP | 1330098 A1 | 7/2003 |
| WO | WO 99/26159 A2 | 5/1999 |

OTHER PUBLICATIONS

PCT International Search Report and Written Opinion, PCT/US2006/014060, Sep. 1, 2006, 12 pages.

* cited by examiner

PERIPHERAL DEVICE FOR A WIRELESS COMMUNICATION DEVICE

CROSS-REFERENCE TO RELATED APPLICATION

This application claims the benefit under 35 U.S.C. § 119(e) of U.S. Provisional Application No. 60/460,013, filed Apr. 2, 2003, entitled "Peripheral Device for a Wireless Communication Device" by inventor Jeffrey C. Hawkins."

BACKGROUND

1. Field of the Invention

The present invention is related to peripheral devices for wireless communication devices, and more particularly to a peripheral device that allows a user to interact with data on a wireless communication device.

2. Background Art

Wireless communication devices, such as cell phones, have become more intelligent over the past years. In addition to providing conventional wireless functionality for allowing voice telephony, these devices have also been used for tasks such as taking notes at a meeting or lecture, scheduling appointments, looking up addresses, surfing the World Wide Web, sending electronic messages, and performing a whole host of other functions.

Existing wireless communication devices usually offer a relatively small screen that presents significant usability problems when users attempt to perform advanced tasks with the device. For example, when a user of a wireless communication device accesses the Web, he or she can usually only see small portions of pages at a time. Some web browsers for wireless communication devices attempt to fit an entire page (or at least a portion equivalent to that which a user would see on a normal PC display) on a miniature screen. Such screen size limitations frustrate the user experience.

Furthermore, most existing wireless communication devices offer a small keyboard that inhibits usability. Such keyboards generally cannot provide the same functionality and convenience as a full-sized keyboard.

One traditional solution is to provide an add-on standard-sized keyboard. For example, the STOWAWAY keyboard, manufactured by Think Outside, Inc., is an add-on hardware accessory available for wireless communication devices. This portable keyboard transforms from a compact, eight-ounce box into a standard-sized keyboard. Once a user snaps the device into this portable keyboard, the user is ready to type.

Add-on keyboards such as the STOWAWAY suffer from several drawbacks. For example, such devices are often cumbersome to carry, unfold, and connect to a wireless device. Furthermore, such add-on input devices fail to provide an integrated mechanism that, in addition to providing improved input capabilities, allows a user to view and interact with applications on a full-sized screen.

What is needed is an inexpensive device that provides both an add-on full-sized keyboard and a full-sized screen in a single integrated unit that easily connects to a wireless communication device and allows direct interaction with data on the wireless communication device.

SUMMARY OF THE INVENTION

The present invention provides a peripheral device for a wireless communication device that combines a full-sized input device and a full-sized display screen in a single device. A user interacts with data stored on the wireless communication device using the peripheral device as an input/output device. The peripheral device accesses data residing on the wireless communication device and uses such data in executing applications. Documents, files, and other data resulting from execution of applications are stored on the wireless communication device. Since the data stays on the wireless device, users need not be concerned with transferring data back and forth, or with performing synchronization operations to ensure that all changes are up to date on both devices. The peripheral device is capable of operating with any wireless communication device adapted to establish a connection with the peripheral device, such as a cell phone, or with other devices that may or may not include wireless functionality, such as handheld computers, PDAs, pagers, and the like.

In one embodiment, the device of the present invention is designed to have an outward appearance resembling a conventional laptop computer, including a keyboard panel and a screen panel, connected by a hinge. The peripheral device is capable of performing automatic configuration and wireless connection to a device. In one embodiment, whenever the user opens the peripheral, the peripheral automatically turns itself on and attempts to establish a connection with the wireless communication device.

The peripheral device is connected to the wireless communication device using any communication technology that allows for data transmission between the peripheral device and the wireless communication device. In a preferred embodiment, the peripheral device and the wireless communication device are connected using a wireless connection. In another embodiment, the peripheral device connects to the wireless communication device using an electrical or optical cable interface. In yet another embodiment, the peripheral device connects to the wireless communication device using a mechanical interface.

The peripheral device can be implemented according to various embodiments. In one embodiment, the peripheral device acts as an input/output device for the wireless communication device so that applications run only on the wireless communication device and not on the peripheral device; accordingly, the peripheral device need not even include a CPU. In another embodiment, the peripheral device is capable of downloading applications residing on the wireless communication device and running them using the CPU of the peripheral device. In yet another alternative embodiment, the peripheral device is capable of storing applications and/or data from one session to the next, so as to minimize the amount of information to be transferred between the devices, and to act as a backup mechanism for data stored on the wireless communication device. Such an arrangement advantageously allows a user to restore data if the data is lost on the wireless communication device.

As mentioned above, the peripheral device of the present invention may be implemented in a laptop-like configuration including a screen and keyboard. Alternatively, the peripheral device can be implemented as software running on a conventional computer system, such as a laptop computer or desktop computer. In such an embodiment, the peripheral device runs software that allows the device to function as a peripheral device for a wireless communication device.

The peripheral device uses the wireless communication device to connect to available networks such as the Internet. For example, a user of the peripheral device makes use of a browser application, such a Netscape Navigator or Microsoft Internet Explorer, to request web pages and interact with received web pages. The wireless communication device acts as an intermediary in passing requests for web pages and providing web pages to a user of the peripheral device. Depending on the particular embodiment, as described herein, the browser application may run on the wireless communication device or on the peripheral device itself.

DETAILED DESCRIPTION OF THE PREFERRED EMBODIMENTS

Figure 1:
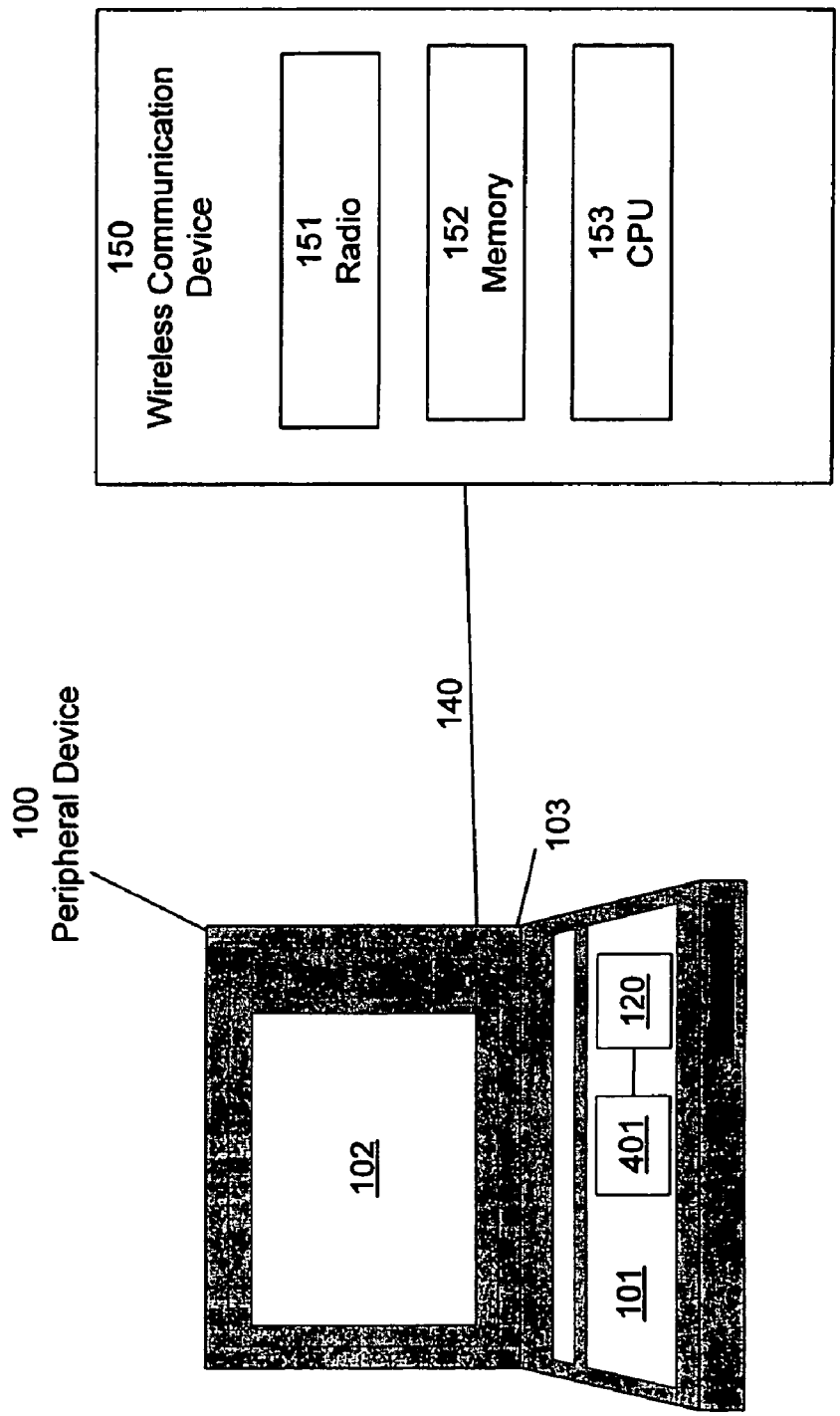
FIG. 1 is an illustration of a peripheral device for a wireless communication device in accordance with an embodiment of the present invention.

FIG. 1 shows a peripheral device (hereinafter also referred as "peripheral" or "device") 100 for use with a wireless communication device 150. Device 100 includes various components, such as a central processing unit (CPU) 401, memory 120, display 102, and input devices such as a keyboard, mouse, touch pad, and the like (these components are shown below in FIG. 5). In one embodiment, peripheral device 100 is designed to outwardly resemble a laptop computer, including keyboard panel 101 and display panel 102, connected by hinge 103. One skilled in the art will recognize, however, that the present invention can be embodied in other physical forms than those depicted herein.

Device 100 is capable of operating with a wireless communication device 150 such as a cell phone, or other device such as a handheld computer or personal digital assistant (PDA). Wireless communication device 150 typically includes a radio 151, a memory 152 for storing applications, and a central processing unit (CPU) 153 for executing applications stored in memory.

Peripheral device 100 is capable of performing automatic configuration and wireless connection to device 150. In one embodiment, device 100 turns itself on and establishes a wireless connection to device 150 whenever a user opens device 100. Closing device 100 causes it to terminate the connection with device 150 and to turn itself off.

Peripheral device 100 is capable of operating with various types of wireless communication devices 150, including for example cell phones. In one embodiment the connection between device 100 and device 150 is accomplished using conventional wireless communication protocols, such as, for example, Bluetooth, or any other communication mechanism that allows for data trans-mission between peripheral device 100 and wireless communication device 150. In one embodiment, peripheral device 100 connects to wireless communication device 150 using a wireless communication interface 140, such as a radio frequency link, for example a transceiver (not shown in FIG. 1) or other transmission frequency link to a transceiver coupled to wireless communication device 150.

In an alternative embodiment, peripheral device 100 connects to wireless communication device 150 using an electrical or optical cable interface (not shown). For example, device 100 can be connected to wireless communication device 150 using a universal serial bus ("USB") port of device 100. Alternatively, device 100 can be connected to wireless communication device 150 through serial and/or parallel ports. When connected through a USB port, a USB protocol is used to transmit data between wireless communication device 150 and peripheral device 100. It will be appreciated that other protocols include, for example, IEEE 1394 FireWire, Ethernet and TCP/IP.

In yet another embodiment, peripheral device 100 is physically connected to wireless communication device 150 using a mechanical interface, such as a cable, a mechanical connector, such as a mating connector, or the like.

Peripheral device 100 can be implemented in any of various embodiments. In one embodiment, a user interacts with data stored on wireless communication device 150 using peripheral device 100 as an input/output device. Data remains on device 150 and is not stored on device 100. Thus, users need not be concerned with transferring data back and forth between devices 100 and 150, or with synchronizing data to ensure that changes are up to date on both devices. In such an embodiment, device 100 can be implemented without CPU 401 and local memory 120, so that device 100 acts purely as an input/output device with respect to device 150. The results of program execution remain on wireless communication device 150.

In such an embodiment, peripheral device 100 downloads applications from wireless communication device 150 and stores them, at least temporarily, in memory 120 and/or in a storage device such as a hard drive (not shown in FIG. 1). When a user accesses an application, the application is loaded to CPU 401 of device 100 from memory 152 wireless communication device 150. CPU 401 of peripheral device 100 executes applications using data received from wireless communication device 150. The results of the execution are stored in memory 120 of wireless device 100, and are periodically transferred (if applicable) to device 150.

Figure 2:
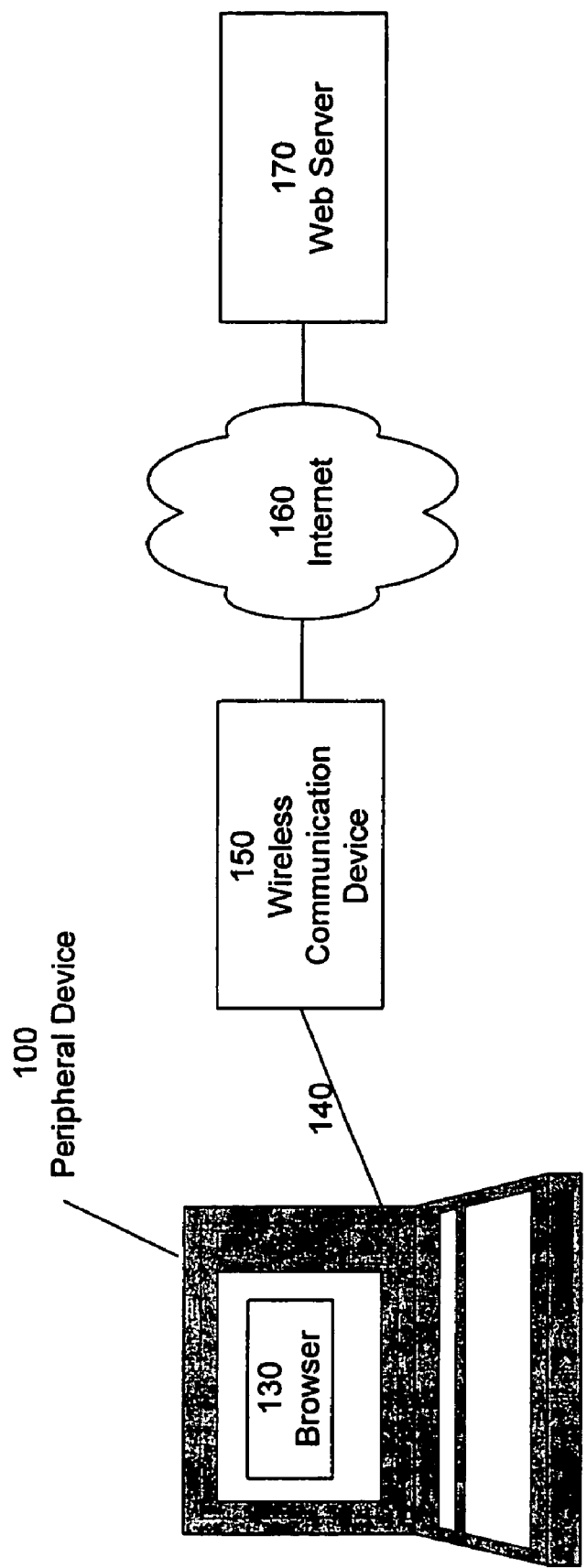
FIG. 2 is an illustration of a wireless communication device that provides network connectivity to the peripheral device of the embodiment of FIG. 1.

Referring now to FIG. 2, there is shown wireless communication device 150 connected to the Internet 160. Device 150 connects to the Internet 160 via an Internet Service Provider (not shown), or by a direct connection, or by some other means according to techniques that are well known in the art. Web server 170 is a computer running software for serving pages across the Internet 160; such software may include, for example, Microsoft Internet Information Server (IIS) or Apache Server. According to the techniques of the present invention, the user can view web pages from server 170 on peripheral device 100. To provide such functionality, device 100 accesses the Internet 160 via wireless communication device 150. Specifically, when a user of device 100 uses browser application 130, such as Netscape Navigator or Microsoft Internet Explorer, to request web pages from web server 170 and interact with received web pages, wireless communication device 150 acts as an intermediary in passing requests for web pages to web server 170 and providing web pages to be displayed on device 100.

Peripheral device 100 can be used for other operations besides accessing web pages. For example, the user can use device 100 to compose, send, and receive email messages by running email software such as Microsoft Outlook to connect to a mail server (not shown) to check for email messages and display received messages. As with the web operations described above, wireless communication device 150 acts as an intermediary in passing requests to the mail server and providing messages to a user of device 100. Similarly, the user can use device 100 to run other types of software applications such as spreadsheets, word processors, and the like on device 150.

Figure 5:
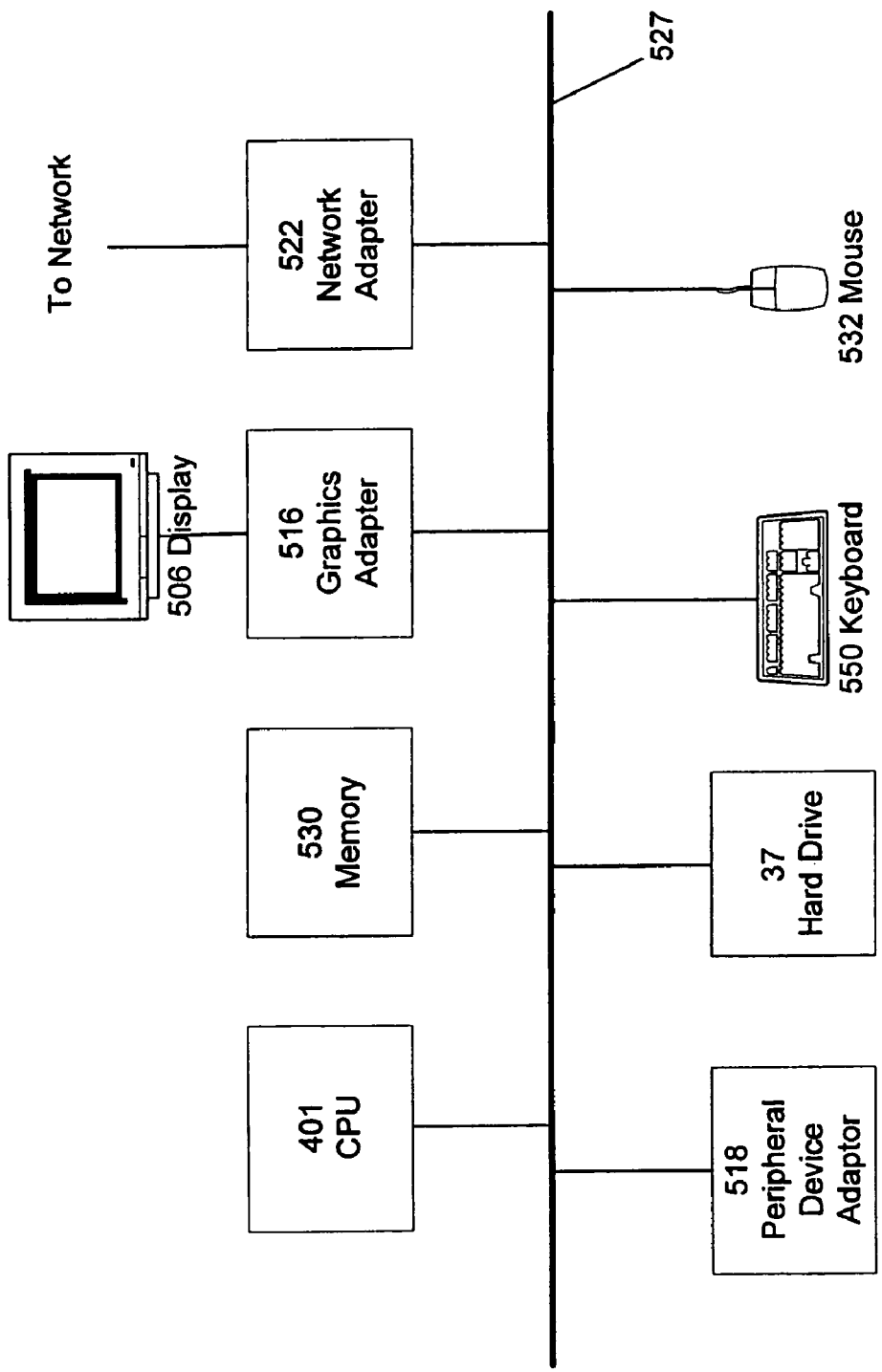
FIG. 5 is a high-level block diagram of an embodiment of a computer system for use as the peripheral device.

In another embodiment, where wireless communication device 150 does not provide network connectivity, peripheral device 100 may connect to server 170 using a network card (shown in FIG. 5). In yet another embodiment, peripheral device 100 does not connect to a server, but runs applications in a "stand-alone" mode that does not require network connection.

Figure 3:
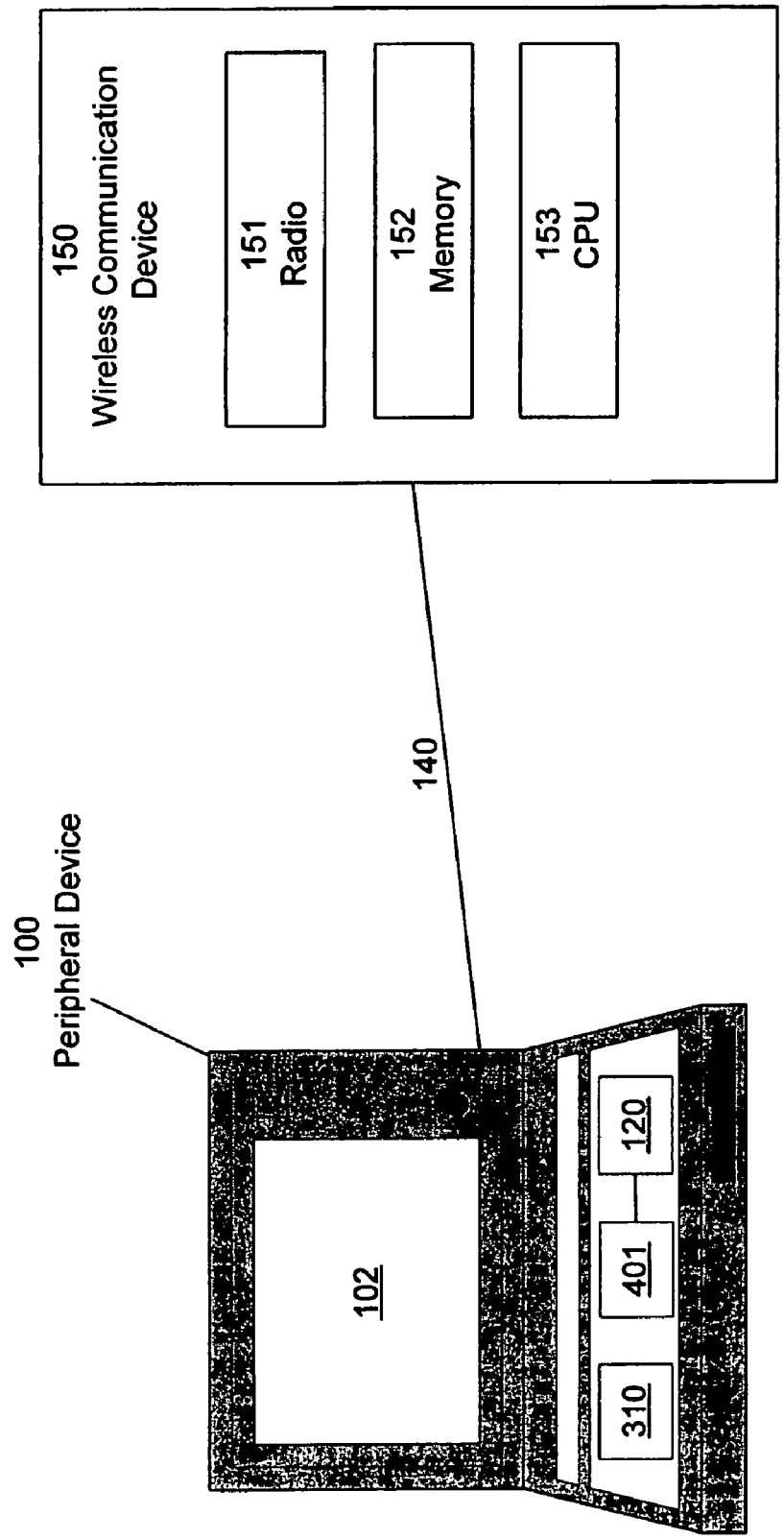
FIG. 3 is an illustration of a peripheral device having a backup memory.

Referring now to FIG. 3, there is shown an embodiment of peripheral device 100 having a backup memory 310 adapted to receive and store data from wireless communication device 150. Backup memory 310 can be implemented using static memory, dynamic memory, magnetic or optical media, or any other type of storage mechanism. Such an embodiment advantageously allows a user to restore backed-up data from memory 310 in the event data is lost on wireless communication device 150. Such data loss is not uncommon in connection with wireless communication device 150 and may occur, for example, as a result of battery failure or accidental erasure due to hardware or storage media failure, or human error. In such an embodiment, device 100 may periodically run a utility software program (not shown), either automatically or under user control to perform backup operations including copying data from device 150 to device 150; such a program may be stored, for example, in local memory 120 of peripheral device 100. As is known in the art, the operation of the backup program may be configurable to create duplicate copies of relevant data periodically over a predetermined time interval. Alternatively, the backup program may maintain currency of data by monitoring changes in stored data on wireless communication device 150 and duplicating them on peripheral device 100. Such techniques are well known in the art of backup software.

Figure 4:
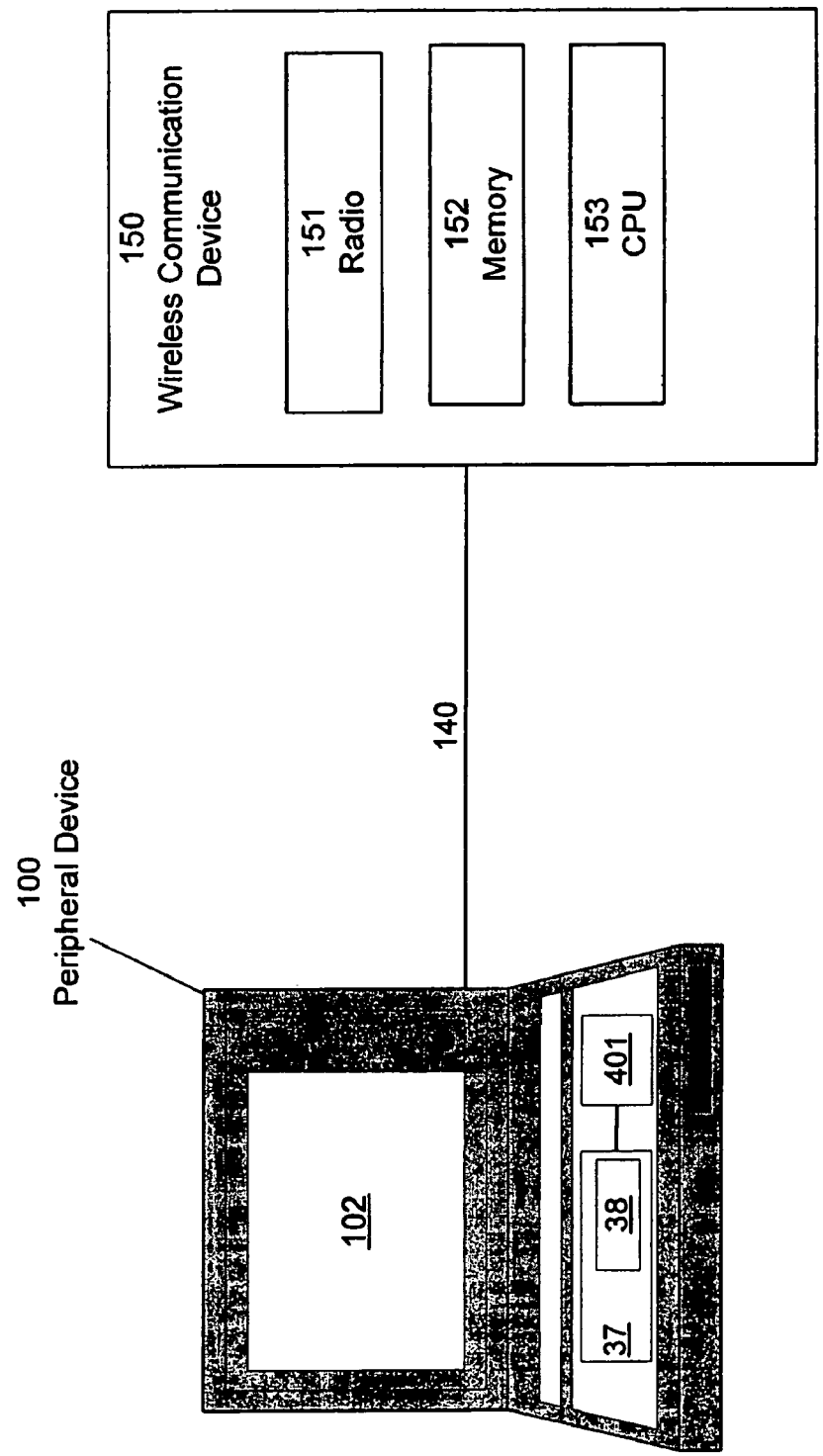
FIG. 4 is an illustration of a computer system running software adapted to cause the computer system to function as the peripheral device of the embodiment of FIG. 1 for the wireless communication device.

Referring now to FIG. 4, there is shown an alternative embodiment of peripheral device 100 as implemented using software running on a conventional computer system, such as a laptop computer 400, rather than using specialized hardware. This embodiment advantageously allows a user to run applications and to access data stored in wireless communication device 150 in a manner as described above, as well as to run conventional software applications in the context of an ordinary operating system such as Microsoft Windows XP or the like. In this embodiment, peripheral device 100 further comprises a hard drive 37 or other storage device as is known in the art of computer systems. Hard drive 37 stores software components 38 that, when run on CPU 401, cause computer 400 to function as a peripheral device 100 for a wireless communication device 150. For example, in one such embodiment, software components 48 cause computer 400 to transmit user-entered input to device 150, and to receive output from device 150 for display on screen 102. In another such embodiment, software applications from device 150 are transferred or copied to PC 100, at least temporarily, where the user can interact with the applications; results from the user's interactions are then transferred or copied to device 150 and stored in memory 152.

The embodiment of FIG. 4 may be implemented using any type of computer 400. Referring now to FIG. 5, there is shown a high-level block diagram of an embodiment of a computer system 400 for use as device 100. One skilled in the art will recognize that the arrangement shown in FIG. 5 is merely exemplary of a particular embodiment, and that other architectures and systems may be used to implement the present invention. Computer system 400 includes CPU 401, which may be any specific or general-purpose processor such as an INTEL x86 or POWERPC-compatible central processing unit capable of executing applications stored on the storage device 37. CPU 401 is coupled to bus 527. Also coupled to bus 527 are memory 530, input devices such as a keyboard 550 and mouse 532 (or other pointing device), graphics adapter (also referred as a "video graphics adaptor") 516, pointing device 532, network adapter 522, display screen 506, hard drive 37 or other storage device, and peripheral device adapter 518. All such components operate according to techniques that are well known in the art of computer systems.

In one embodiment, CPU 401 is a microprocessor subsystem that is configured to enable data communications between computer 400 and wireless communication device 150. Such a microprocessor subsystem includes, for example, a 32-bit embedded Reduced Instruction Set Computer (RISC) microprocessor manufactured by Advanced RISC Machines (ARM). The microprocessor subsystem may be a conventional integrated circuit. The microprocessor subsystem may also include one or more volatile or non-volatile memories and/or memory caches for storing data, instructions, commands, and/or other information.

CPU 401 can also be connected to a peripheral device adapter 518, an example of which is a Universal Serial Bus (USB) port. As previously described, in one embodiment peripheral device 100 (as implemented in computer system 400) can be connected to wireless communication device 150 via a USB port.

Display screen 506 is adapted to display a graphical output of applications executed on peripheral device 100. Display screen 506 can be, for example, a glide point display screen, a touch-sensitive screen, a liquid crystal display, or the like.

Memory 530 holds instructions and data to be used by the processor 526. Memory 530 may be implemented as a read-only memory (ROM), a random access memory (RAM), or the like. Memory 530 stores software instructions and data for applications to be executed by processor 526. For example, memory 530 stores software code for running browser application 130 shown in FIG. 2. In one embodiment, memory 530 stores such instructions and data only for the duration of a session; in another embodiment, it maintains instructions and data from session to session so as to avoid repeatedly transferring such information for subsequent sessions.

Graphics adapter 516 is adapted to connect display screen 506 to bus 527. The network adapter 522 connects the computer system 400 to a local and/or wide area network when needed.

As will be appreciated by those of skill in the art, the computer system 400 of the present invention may exist in a variety of embodiments, including embodiments in which computer system 400 includes more or fewer physical components than are illustrated in FIG. 5. For example, in an embodiment where computer system 400 performs backup functionality, system 400 further includes backup memory 310 (shown in FIG. 3) adapted to receive data from wireless communication device 150 and to store backup data from wireless communication device 150.

As previously described, peripheral device 100 can be implemented as a software application running on a conventional computer system 400, such as a laptop, desktop computer, or the like. Such computer system 400 further comprises storage device 37 (shown in FIG. 4) capable of holding large amounts of data, such as a hard drive, compact disk read-only memory (CD-ROM), DVD, or some other from of fixed or removable storage device. Storage device 37 stores software components that allow system 400 to function as peripheral device 100 of this embodiment. In this embodiment, CPU 401 is any specific or general-purpose processor such as an INTEL x86 or POWERPC-compatible central processing unit (CPU) running a conventional operating system (such as Microsoft Windows), and capable of executing applications stored on storage device 37 and loaded into the memory 530.

The invention claimed is:

1. A peripheral device for operation in conjunction with a handheld wireless communication device, the peripheral device comprising:
   an enclosure having an opened position and a closed position;
   an alphanumeric keyboard located on a first part of the enclosure and configured to receive user input data;
   a communication interface operable to automatically establish connectivity with the handheld wireless communication device in response to a transition of the enclosure from the closed position to the opened position, to receive first data and software code for a peripheral application from the handheld wireless communication device, and to transmit second data to the handheld wireless communication device, the first and second data being interactable by an application on the handheld wireless communication device, the peripheral application being associated with the application on the handheld wireless communication device;
   a screen located on a second part of the enclosure and configured to display at least part of the first and second data;
   a backup memory, operably coupled to the communication interface, for storing a backup copy of the first data; and
   a processor, coupled to the alphanumeric keyboard, the enclosure, the communication interface, and the screen, operable to execute the software code for the peripheral application using the user input data and the first data thereby generating the second data.

2. The peripheral device of claim 1, wherein the peripheral device automatically switches to an on state in response to at least one predefined event.

3. The peripheral device of claim 1, wherein the communication interface further transmits a signal to the handheld wireless communication device directing the handheld wireless communication device to transmit at least one data item and a data request via a network connection.

4. The peripheral device of claim 1, wherein the communication interface further receives a signal from the handheld wireless communication device representing at least one data item received by the handheld wireless communication device via a network connection.

5. The peripheral device of claim 3, wherein the network connection comprises an Internet connection.

6. The peripheral device of claim 1, wherein the communication interface further operable to automatically establish connectivity with the handheld wireless communication device in response to a signal transmitted by the handheld wireless communication device.

7. The peripheral device of claim 1, wherein the second data is stored in a storage medium on the peripheral device.

8. The peripheral device of claim 1, where the second data is stored in a storage medium on the handheld wireless communication device.

9. The peripheral device of claim 1, further comprising a network interface, coupled to the processor, for transmitting at least a data item and a data request via a network connection, and for receiving at least one data item via the network connection.

10. The peripheral device of claim 1, further comprising memory for storing the first data and the second data.

11. The peripheral device of claim 10, wherein the memory stores the first data and the second data from one user session to at least one subsequent user session.

12. A peripheral device for a handheld computing system, the peripheral device comprising:
   an enclosure having an opened position and a closed position;
   a communication interface operable to automatically establish connectivity with the handheld wireless communication device in response to a transition of the enclosure from the closed position to the opened position, the communication interface structured to receive first data and software code for a peripheral application from the handheld computing system and transmit second data to the handheld computing system, wherein the first data and the second data are interactable by a handheld application on the handheld computing system, the peripheral application being associated with the handheld application;
   a backup memory, operably coupled to the communication interface, for storing a backup copy of the first data;
   a display communicatively coupled with the communication interface and structured to visually present at least part of the first data and the second data;
   an alphanumeric keyboard hingedly coupled with the display and structured to receive a user input, the user input being for manipulating the first data; and
   a processor coupled to the communication interface, the backup memory, the alphanumeric keyboard, and the display and configured to execute the software code for the peripheral application using the user input and the first data thereby generating the second data.

13. The peripheral device of claim 12, wherein the display comprises graphics processor for rendering full-screen display.

14. The peripheral device of claim 12, wherein the alphanumeric keyboard comprises consecutive keys of Q-W-E-R-T-Y.

15. The peripheral device of claim 12, further comprising a processor configured to process the visually presented data prior to transmitting the second data to the handheld computer system.

16. The peripheral device of claim 12, further comprising a memory to temporarily store the visually presented data.

17. The peripheral device of claim 12, wherein the communication interface comprises a Bluetooth communication interface.

18. The peripheral device of claim 12, wherein the communication interface comprises a tethered communication interface.

19. The peripheral device of claim 12, further comprising a power management module configured to instantly place the display and the alphanumeric keyboard in an instant on state or an instant off state.

20. The peripheral device of claim 12, wherein the handheld computing system comprises a personal digital assistant.

* * * * *